US006719339B1

(12) United States Patent
Yoham

(10) Patent No.: US 6,719,339 B1
(45) Date of Patent: Apr. 13, 2004

(54) VEHICLE PROTECTION ASSEMBLY

(76) Inventor: Richard Yoham, 6301 SW. 72$^{nd}$ St., Miami, FL (US) 33143

( * ) Notice: Subject to any disclaimer, the term of this patent is extended or adjusted under 35 U.S.C. 154(b) by 0 days.

(21) Appl. No.: 10/303,527

(22) Filed: Nov. 25, 2002

(51) Int. Cl.$^7$ .............................. B60R 19/42; B60J 11/00
(52) U.S. Cl. ................ 293/128; 296/136.04; 296/136.1
(58) Field of Search .............................. 293/128; 296/98, 296/136, 37.15, 37.16, 39.1, 136.01, 136.02, 136.04, 136.08, 136.1; 160/DIG. 2

(56) References Cited

U.S. PATENT DOCUMENTS

| 3,540,773 | A | | 11/1970 | Settle, Jr. et al. | |
|---|---|---|---|---|---|
| 3,563,594 | A | | 2/1971 | London | |
| 3,718,357 | A | | 2/1973 | Hertzell | |
| 4,118,066 | A | * | 10/1978 | Ricke | 296/136 |
| 4,234,222 | A | | 11/1980 | Bays | |
| 4,437,697 | A | | 3/1984 | Hinojos | |
| 4,493,502 | A | | 1/1985 | Campbell, Jr. | |
| 4,561,685 | A | | 12/1985 | Fischer | |
| 4,834,446 | A | * | 5/1989 | Tung-Chow | 296/136 |
| 4,991,891 | A | | 2/1991 | Karshens | |
| 5,071,181 | A | | 12/1991 | Wagner | |
| 5,184,857 | A | | 2/1993 | Hawkins | |
| 5,273,316 | A | * | 12/1993 | Infante | 296/136 |
| 5,328,230 | A | * | 7/1994 | Curchod | 296/136 |
| 5,409,286 | A | * | 4/1995 | Huang | 296/136 |
| 5,855,406 | A | * | 1/1999 | Vargo | 296/136 |
| 6,131,643 | A | * | 10/2000 | Cheng et al. | 296/136 |
| 6,371,547 | B1 | * | 4/2002 | Halbrook | 296/136 |

* cited by examiner

Primary Examiner—Stephen T. Gordon
Assistant Examiner—Greg Blankenship
(74) Attorney, Agent, or Firm—Malloy & Malloy, P.A.

(57) ABSTRACT

As assembly structured to protect external surface areas of an automobile or like vehicle including a housing of portable, lightweight construction removably mounted within the interior of the vehicle. An elongated flexible protective member is movably connected to the housing and selectively positionable between an outwardly extended operative position, wherein the protective member overlies exterior surfaces of the vehicle, and a retracted position, wherein at least a majority of the length of the protective member is stored within the interior of the housing. The protective member is preferably of sufficient length to extend in overlying relation to a midline surface area and in substantially surrounding relation to an outer periphery of the vehicle.

18 Claims, 2 Drawing Sheets

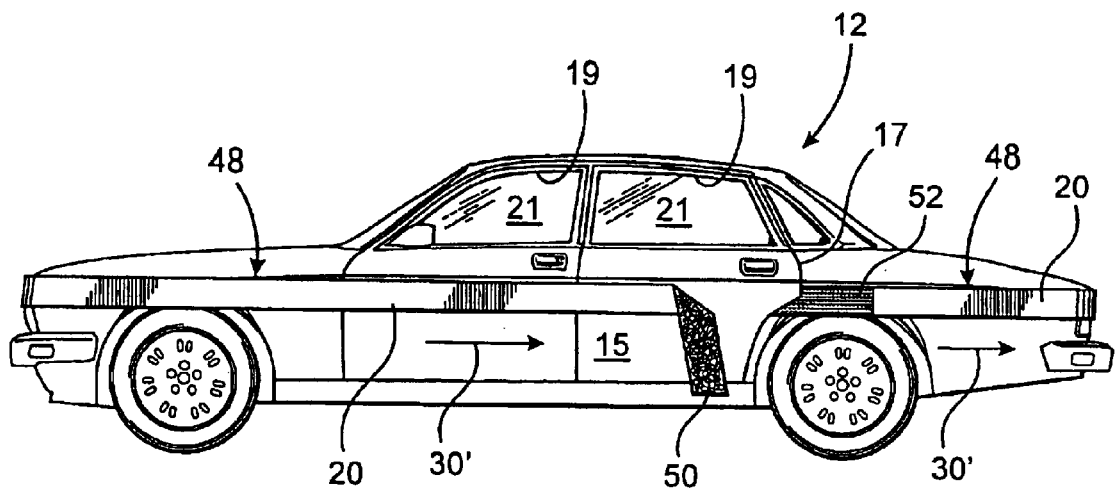
FIG. 1
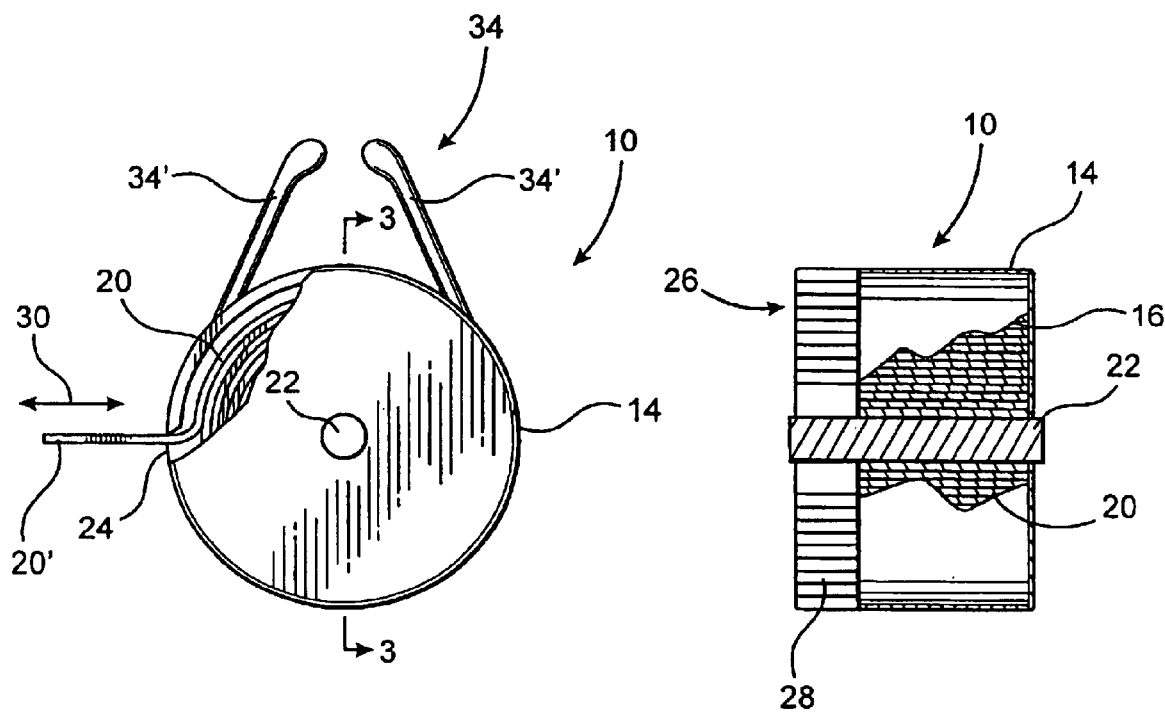
FIG. 2
FIG. 3

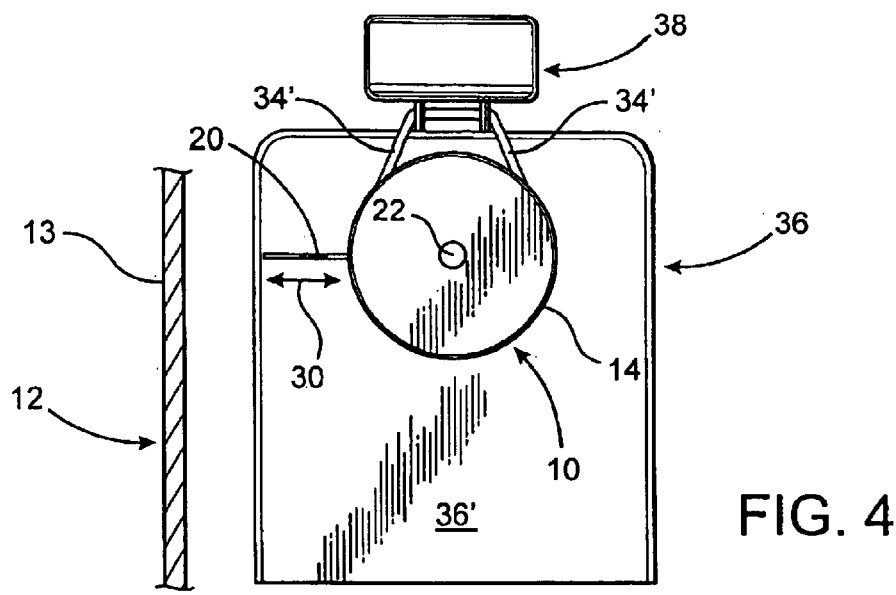
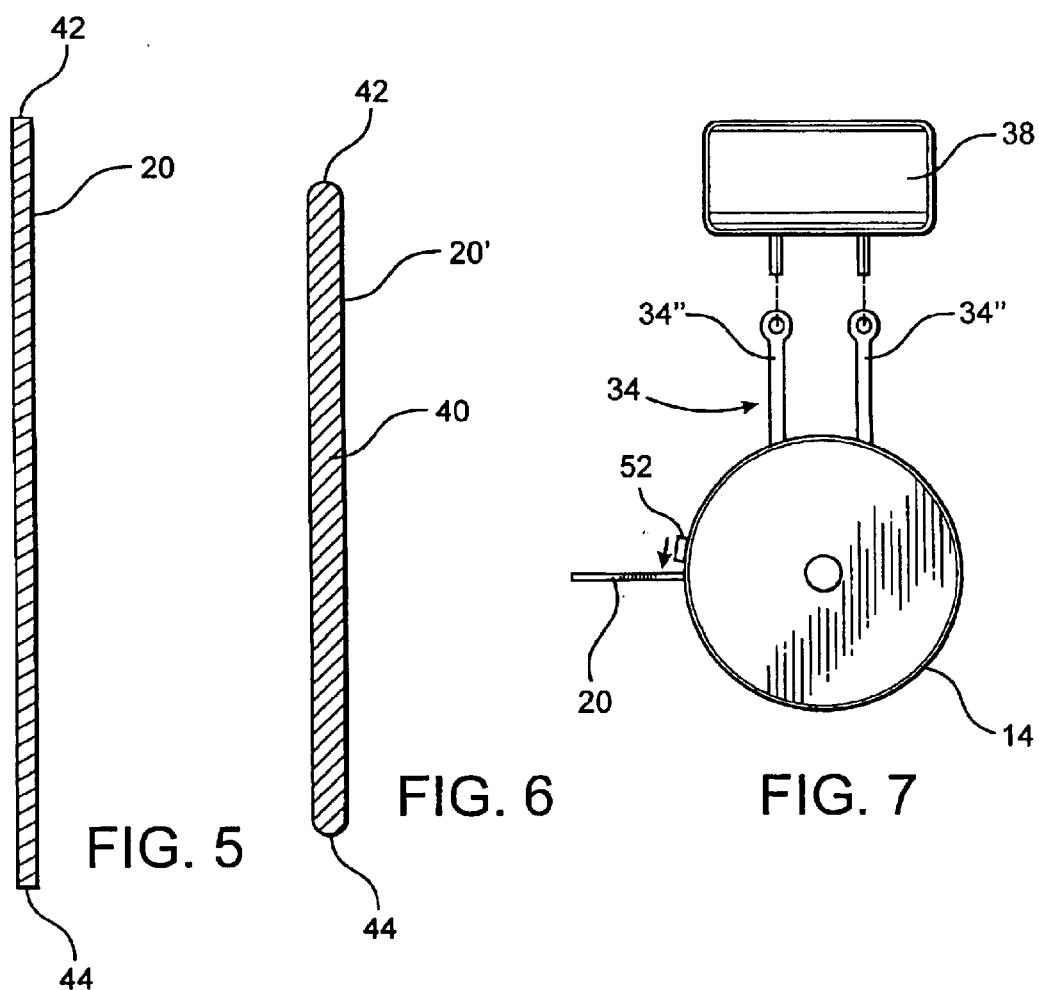

VEHICLE PROTECTION ASSEMBLY

BACKGROUND OF THE INVENTION

1. Field of the Invention

This invention relates to a vehicle protection assembly preferably of portable, lightweight construction capable of being utilized with a variety of different automobiles or like vehicles and including an elongated protective member selectively positionable outwardly from an interior of the vehicle in overlying relation to exterior surfaces of the vehicle body.

2. Description of the Related Art

It is commonly recognized that automobiles and other vehicles suffer minor but annoying damage to the exterior surface portions thereof. Typically, such damage is caused by the doors of adjacently parked vehicles being carelessly opened when occupants enter or leave the adjacent vehicles. Naturally, a variety of other situations arise which may cause damage to the side or peripheral surface portions of the vehicle, such as by grocery or shopping carts running into the vehicle when the carts are not carefully attended. Regardless of the cause most vehicles, over a relatively short period of time can develop damage to exterior surface portions thereof. Moreover, when collectively considered, such exterior surface damage is unsightly and costly to repair.

In an effort to overcome such problems, there have been numerous attempts to design bumper or surface protecting strips, cushion devices and a variety of other protective structures. Typically such conventional devices are selectively positioned on the exterior of the vehicle in overlying, covering relation primarily to the vehicle doors, it being recognized such locations are most prevalent to receiving dents, scratches, etc. from adjacently positioned vehicles. In disposing known devices of the type set forth above in their protective position, one such category simply involves the temporary mounting of a padding or cushioning material in covering relation to the exterior surface being protected.

However, more complex protecting assemblies may involve the fixed and/or permanent attachment of a housing or casing to the vehicle. In use, a protective covering may be selectively positioned into and out of an overlying orientation relative to the surface being protected. In this latter category of devices, there exists recognized problems associated with mounting and/or installation, as well as efficiently locating such devices so that the protecting material can be properly positioned as intended. Also, these more complex protecting structures suffer from a lack of versatility in that they cannot be easily removed from one vehicle and mounted on or installed in another. Such versatility would of course be a distinct advantage in families having more than one automobile or other type of motor vehicle.

Accordingly, there is a significant and long recognized need for a vehicle accessory capable of being used with literally any type of automobile or like motor vehicle which serves to protect extensive areas of the exterior surface thereof. Such an assembly should demonstrate sufficient structural versatility to overcome many, if not all, of the disadvantages and problems recognized in conventional or known vehicle surface protectors. More specifically, an improved vehicle protection assembly of the type referred to herein may be transferred between a plurality of vehicles, by being formed of a lightweight, portable construction. This feature would enable users of such a preferred protection assembly to easily and quickly remove it from one vehicle for use on another vehicle, without being concerned with mounting or installation requirements.

Further, the overall structural and operative features of a preferred protection assembly should include an elongated protective element having sufficient flexibility and length, to provide for protection of a greater than normal exterior surface area of the vehicle. As such, the protective element should be capable of extending about at least a majority, if not the entire periphery of the vehicle, so as to better protect more surface area from contact by adjacently positioned automobiles or other vehicles. In addition, such a preferred vehicle protection assembly, while being portable, should be formed of a durable material thereby being capable of a long operable life, while being available to the consuming public at a reasonable price.

SUMMARY OF THE INVENTION

The present invention is directed to an assembly to protect exterior surface portions of an automobile or other vehicle from minor but sometimes costly damage. It is well known that surface damage is all to frequently caused by adjacently positioned vehicles, or other objects, forcibly coming into contact with the exterior surfaces of a parked vehicle. Such contact commonly occurs when occupants enter or leave the adjacent vehicle and when so doing, carelessly open the door too far.

In accordance with at least one preferred embodiment of the present invention, an elongated protective member is selectively disposed in an operative position wherein it overlies exterior surface areas of the vehicle which are most prone to being damaged, in the manner set forth above. As will be explained in greater detail hereinafter, the dimensions of the protective member are such as to overlie and thereby protect a "midline" surface area of the vehicle. The midline surface area may be more specifically defined as an external surface of the vehicle extending about at least a majority of its outer periphery and in surrounding relation to the vehicle. Further, the midline surface area may be located in a somewhat outwardly bowed or extended position on the vehicle. In such an orientation, the midline surface is the external area of the vehicle most likely to be contacted and therefore damaged, such as by the doors of adjacently positioned vehicles being opened in a careless manner.

More specifically, the assembly of the present invention comprises a housing having a substantially lightweight construction and otherwise specifically structured to be portable so as to be removably secured within the interior of the vehicle. The portable nature of the housing, as well as the other associated components of the protection assembly of the present assembly, allow it to be easily relocated into any number of different vehicles. As such, the portable nature of the protection assembly provides increased versatility by eliminating the necessity of permanently mounting the assembly to interior portions of a vehicle. Further, when not in use it may be stored in a more conventional storage area, such as the trunk of the vehicle, especially in situations where the vehicle is filled with occupants. When the vehicle is parked, the housing is removed from the trunk or other storage area, placed in a preferred, secured, location within the vehicle which best facilitates the deployment of the protective member from the housing.

The protective member, as set forth above, has an elongated configuration and in at least one preferred embodiment to be described hereinafter, is selectively positionable into either an operative position or a retracted position. In the retracted position, at least a majority or substantially the entire length of the protective member is disposed in a coiled orientation, wherein the length thereof is wound about itself in a compact array so as to require minimum volume for storage. When intended for use, the protective member is withdrawn from the interior of the housing through an appropriate access opening. Because of the portable nature of the protection assembly, the housing is best disposed on the interior of the vehicle to eliminate theft when the vehicle is unattended. Accordingly, the protective member, once disposed in the operative position, extends outwardly from the housing on the interior of the vehicle and passes to an exterior thereof, such as between a door and door frame. The thin, flexible construction of the protective member allows the door to be closed and locked in the conventional fashion. Further, in at least one embodiment of the present invention the protective member may also pass from to the exterior of the vehicle through a window while still allowing the window to be closed, for purposes of security.

One feature of the present invention is the extended longitudinal dimension of the protective member being sufficient to substantially surround the entire outer periphery of the vehicle in overlying relation to the midline surface area, as set forth above. Additional structural features of the protection assembly of the present invention include the provision of an attachment assembly. The attachment assembly is disposed and structured to maintain the protective member in its operative position, in surrounding relation to the periphery of the vehicle.

Moreover, one embodiment of the present invention comprises the attachment assembly having at least two attachment segments which are disposed in spaced relation to one another. The attachment segments are further disposed and structured to allow the protective member to be secured to itself, such as by the free vend thereof being removably secured to a spaced apart portion of a length of the protective member. The structuring of the attachment assembly is such that the protective member is maintained in the operative position, while allowing quick and easy separation of the attachment segments from one another when it is desired to dispose the protective member into the retracted position.

As will also be explained hereinafter, the protection assembly of the present invention further includes a connecting assembly which may comprise a drive structure including a biasing assembly associated therewith. The biasing assembly is interconnected to the protective member through a drive or support shaft or other interconnecting structure. Therefore, cooperative structuring between the biasing means, support shaft and protective member is such as to normally bias the protective member into the retracted position on the interior of the housing.

The protection assembly of the present invention therefore provides an efficient, low cost structure for protecting exterior surface areas of a vehicle along substantially the entire periphery thereof and especially along a mid-line surface area which is considered to be most frequently damaged by inadvertent yet forceful contact with adjacent vehicles or other structures. In addition, the portable nature of the protection assembly of the present invention serves convenient and cost saving advantage in that the housing and the protective member associated therewith can be quickly and easily removed from one vehicle and used in another. The necessity of permanently mounting a surface protecting structure on each of a plurality of vehicles is thereby eliminated.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a side view of a vehicle with the protection assembly of the present invention disposed in overlying, protecting relation to exterior, peripheral surface areas thereof.

FIG. 2 is a front view in partial cutaway of the protection assembly of the present invention.

FIG. 3 is a sectional view in partial cutaway along line 3—3 of FIG. 2.

FIG. 4 is a front view of the protection assembly of the present invention mounted within an interior of a vehicle and removably secured to a seat assembly associated therewith.

FIG. 5 is a sectional view of one preferred embodiment of a protective member associated with the protection assembly of the embodiment of FIGS. 1 through 4.

FIG. 6 is a cross-sectional view of yet another preferred embodiment of the protective member of the present assembly.

FIG. 7 is a front view of another embodiment illustrating an alternate mounting assembly.

Like reference numerals refer to like parts throughout the several views of the drawings.

DETAILED DESCRIPTION OF THE PREFERRED EMBODIMENT

As shown in the accompanying drawings, the present invention is directed towards a protection assembly generally indicated as 10, and structured to protect exterior surface portions of an automobile or like vehicle generally indicated as 12. More specifically, the protection assembly 10 of the present invention is intended to significantly reduce the damage to exterior, peripheral surface areas of vehicles caused by forceful contact with adjacently parked or positioned vehicles or other objects, in an efficient and cost effective manner. As such, the protection assembly 10 includes a housing 14 having an at least partially hollow or open interior as at 16. The housing 14 is preferably of lightweight construction and is otherwise dimensioned and configured to facilitate it being easily carried or transported between different vehicles. The portable nature of the housing 14, and the other operative components associated therewith, allow the same protection assembly 10 to be used with any number of vehicles thereby eliminating the need to permanently or semi-permanently mount some type of protective device within each of a plurality of vehicles.

The protection assembly 10 of the present invention comprises a protective member 20 removably mounted within the interior 16 of the housing 14. Moreover, the protective member 20 has an elongated configuration and is preferably formed from a material of sufficient flexibility to allow it to conform it to the contour of a plurality of different exterior surface areas of the vehicle 12 which it is intended to protect. Therefore, the protective member 20 is selectively positioned between an operative position, as best shown in FIG. 1 and a retracted position, as best shown in FIGS. 2 and 3.

Additional structural features of the protection assembly 10 include a connecting assembly comprising a support shaft 22 or like structure, movably mounted on and at least partially within the housing 14 in supporting relation to the protective member 20. In the preferred embodiment of FIGS. 2 and 3, the protective member 20 is removably disposed in a coiled orientation as it is rolled about itself and supported on the shaft 22. Positioning of the protective member 20 between the retracted position of FIGS. 2 and 3 and the operative position of FIG. 1 is accomplished by exerting a pulling force on a free end 20' of the protective member 20 or other portion of the length thereof. The protective member 20 will extend outwardly from the interior 16 of housing 14, as it passes through an opening or access area 24.

The aforementioned connecting assembly also includes a drive structure generally indicated as 26. The drive structure 26 includes a biasing assembly preferably in the form of a coiled spring or other spring-like structure 28. The biasing spring 28 is connected to the support shaft 22 and thereby interconnected in biasing relation to the protective member 20. The structure and placement of the biasing spring 28 of the drive structure 26 is such as to normally bias or force the protective member 20 into the interior 16 of the housing 14 and into its retracted position. However, the force exerted on the support shaft 22, and accordingly, the protective member 20 is such as to allow easy withdrawal or deployment of the protective member 20 from the interior 16 of the housing 14 into its operative position of FIG. 1. Selective positioning between the operative and retracted positions, as set forth above, is schematically represented by directional arrow 30. Furthermore, if desired, a stopper 52, such as in the form of a button or clip may be provided so as to selectively prevent retraction of the protective member 20 during deployment, thereby facilitating deployment around the vehicle without inadvertent retraction.

One preferred embodiment of the protection assembly 10, includes a mounting assembly generally indicated as 34. The mounting assembly 34 is connected to and generally extends outwardly from the exterior of the housing 14. Further with reference to FIG. 4, the mounting assembly 34 may assume a variety of different configurations such that it may be removably but securely fastened adjacent the headrest 38 by including spaced apart mounting arms, straps, cables, etc. indicated as 34'. However, the size, dimension, placement, and configuration and overall structure of the mounting assembly 34 may vary greatly dependent upon which of a plurality of different interior structures or components of the vehicle 12 on which it is removably disposed. For example, in the case of a single or double post head rest, the mounting assembly may include one or more straps 34" which hook, clip or loop onto the one or more head rest posts as in FIG. 7. In such a supported orientation the housing 14 is disposed in confronting relation to the rear surface or portion 36' of the vehicle seat 36 and is further disposed somewhat adjacent to the side of the vehicle 12 adjacent a door frame 13 or other portion of the vehicle 12.

It should also be noted that the flexible nature of the protective member 20, facilitates it being deployed from the interior 16 of the housing 14 and passed between any one of a plurality of vehicle doors 15 and an associated door frame 13. Accordingly, the door 15 may be maintained in its normally closed and locked position while the protective member 20 extends outwardly from the junction 17 between the door 15 and its associated door frame. It is also emphasized that the material from which the protective member 20 is formed allows it to extend outwardly from the interior of the vehicle 12 through a junction as at 19 when the window 21 is maintained in a closed position.

Other structural features of the positioning assembly 10 are shown in FIGS. 5 and 6 and relate to different preferred embodiments of the specific structure of the protective member 20 and 20'. In the embodiment of FIG. 5, the protective member 20 may include a single integrated material of sufficient flexibility to accommodate the positioning thereof relative to the exterior surface portions of the vehicle 12 being protected as well as the passage thereof through the junction 17 and/or 19, as previously described. Yet another preferred embodiment of the present invention is shown in FIG. 6 wherein the protective member 20' is formed from a flexible material which also includes additional padding or cushioning capabilities. As such, the protective material may be filled or integrally formed with a resilient and/or compressible material 40.

In either of the embodiments of FIGS. 5 and 6, the exterior surfaces of the protective member 20 and 20' should be such as to prevent any type of scratching damage or disfigurement of the exterior surface portions of the vehicle 12 which it overlies, when in its operative position of FIG. 1. As will be explained in greater detail hereinafter, positioning of the protective member 20 in its operative position may result in the exterior surfaces of the protective member 20 or 20' sliding along such exterior surfaces. In doing so, the exterior surfaces over which the protective member 20 passes should not be marred, scratched, etc.

Yet another structural feature of the present invention includes the elongated protective member 20 or 20' having a sufficient longitudinal dimension to allow it, once in the operative position, to substantially surround the entire periphery of the vehicle 12. Moreover, the protective member 20 should be long enough to be disposed in overlying relation to a portion of the exterior surface which is most prevalent to being damaged by adjacently positioned vehicles or other structures, as set forth above. Therefore, the protective member 20 or 20' has a sufficient width or transverse dimension extending between its opposite longitudinal edges or sides 42 and 44 so as to overly and thereby protect a "mid-line" surface area along substantially the entire or at least the majority of the surrounding periphery of the vehicle 12, as demonstrated in FIG. 1. The aforementioned mid-line surface area may also be described as the portion of the exterior peripheral surface of the vehicle 12 which protrudes outwardly, and thereby, is most frequently engaged by the doors of adjacently positioned or parked vehicles. For purposes of clarity, this mid-line surface area is generally designated as 48 and is further represented as the portion of the exterior 'surrounding peripheral surface of the vehicle 12 covered by the protective member 20 when in its operative position of FIG. 1.

Naturally, it will be required to maintain the protective member 20 in its operative position. Accordingly, the protective member includes an attachment assembly. In at least one preferred embodiment, the attachment assembly includes two attachment segments 50 and 52 disposed in spaced relation to one another. More specifically, one attachment segment 50 is located on an inner surface of the free end of the protective member 20. The cooperatively disposed but spaced apart attachment segment 52 is located along the outer surface of a portion of a length of the protective member 20. Further, the attachment segments 50 and 52 are spaced a sufficient distance so that the attachment segment 50 which may be disposed substantially adjacent free end 20', can be attached to a portion of the length of the protective member 20 in overlapping, mating and a removable connection therewith. Moreover, the attachment segments 50 and 52 may cooperatively comprise a removably securable fastener such as, but not limited to, a hook and loop type fastener. For purposes of clarity, the protective member 20 in the embodiment of FIG. 1 is depicted as being disposed in its operative position but not yet completely attached and secured by mating engagement between the attachment segments and 50 and 52.

In operation, the protective member 20 is withdrawn from the housing 14 such as by exerting a pulling force on the free end 20' thereof as shown in FIG. 4. The free end 20' and a majority of the length of the protective member 20 passes through the junction 17 between the door 15 and the door frame 13 and is extended to a sufficient length so that it can pass in surrounding relation to the external periphery of the vehicle 12, as indicated by directional arrows 30'. The joining or mating of the attachment segments 50 and 52 complete the operative positioning of the protective member 20 in which orientation it will be maintained until removable thereof. Upon separation of the attachment segments 50 and 52, the biasing spring 28 or like biasing structure of the drive member 26 will tend to force the protective member 20 back into the retracted position, shown in FIGS. 2 and 3.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly structured to protect exterior surfaces of a vehicle, said assembly comprising:
   a) a housing removably mounted on an interior of the vehicle,
   b) an elongated protective member movably connected to said housing and disposable between an operative position and a stored position,
   c) a mounting assembly connected to said housing and cooperatively disposed to removably mount said housing in a stored position on a seat structure on the interior of the vehicle,
   d) said operative position comprising a length of said protective member extending outwardly from said housing along and in overlying relation to predetermined exterior surfaces of the vehicle, and
   e) said retracted position comprising at least a majority of the length of said protective member disposed within said housing.

2. An assembly as recited in claim 1 wherein said protective member is formed of a flexible material, said operative position further comprising a portion of the length thereof extending in sandwiched relation between a closed door and a doorframe of the vehicle.

3. An assembly as recited in claim 1 wherein said protective member has a sufficient length to extend along at least a majority of an outer periphery of the vehicle when said protective member is in said operative position.

4. An assembly as recited in claim 3 wherein said protective member comprises a predetermined width of sufficient dimension to overlie a midline surface area along the outer periphery of the vehicle.

5. An assembly as recited in claim 1 further comprising an attachment assembly including a plurality of attachment segments, at least of two of said attachment segments being secured to said protective member in spaced apart relation.

6. An assembly as recited in claim 5 wherein said two attachment segments are disposed in mating engagement with one another when said protective member is in said operative position.

7. An assembly as recited in claim 6 wherein said two attachment segments collectively comprise a hook and loop type fastener.

8. An assembly as recited in claim 1 wherein said mounting assembly extends outwardly from a peripheral portion of said housing in at least partially surrounding relation to a portion of the seat.

9. An assembly as recited in claim 8 wherein said stored position comprises said housing disposed in a depending, supported orientation relative to the seat.

10. An assembly as recited in claim 9 wherein said stored position further comprises said housing disposed in substantially adjacent, confronting relation to a rear portion of the seat.

11. An assembly as recited in claim 1 further comprising a connecting assembly interconnecting said protective member to an interior of said housing and comprising a drive structure disposed within said housing and structured to normally bias said protective member into said retracted position.

12. An assembly as recited in claim 11 wherein said connecting assembly comprises a support shaft rotationally connected to said housing and disposed in supporting relation to said protective member.

13. An assembly as recited in claim 12 wherein said protective member is disposed in are movably supported, substantially coiled orientation on said support shaft.

14. An assembly as recited in claim 13 wherein said drive structure comprises a coil spring connected in biasing relation to said support shaft.

15. An assembly as recited in claim 1 wherein said housing is of a portable, lightweight construction.

16. An assembly as structured to protect an exterior surface of a vehicle, said assembly comprising:
   a) a portable housing of lightweight construction removably securable within an interior of a vehicle,
   b) an elongated protective member formed of flexible material and positionable relative to said housing between an operative position and a retracted position,
   c) said operative position comprising at least a majority of said protective member extending outwardly from said housing; said retracted position comprising at least a majority of said protective member extending within said housing;
   d) said protective member having a sufficient length to extend in overlying relation to exterior peripheral surfaces of the vehicles in substantially surrounding relation to the vehicle when in said operative position,
   e) an attachment assembly secured at spaced apart locations along the length of said protective member, and
   f) said attachment assembly disposed and structured to removably secure said protective member to itself when in said operative position.

17. An assembly as recited in claim 16 further comprising a biasing assembly interconnected to said protective member within said housing and structured to normally bias said protective member in said retracted position.

18. An assembly as recited in claim 16 wherein said protective member has a sufficient transverse dimension along at least a majority of its length to overly a midline surface area extending along an outer periphery of the vehicle.

* * * * *